No. 619,385. Patented Feb. 14, 1899.
G. A. BURWELL.
MECHANICAL FASTENING FOR PNEUMATIC TIRES.
(Application filed Mar. 17, 1898.)
(No Model.)
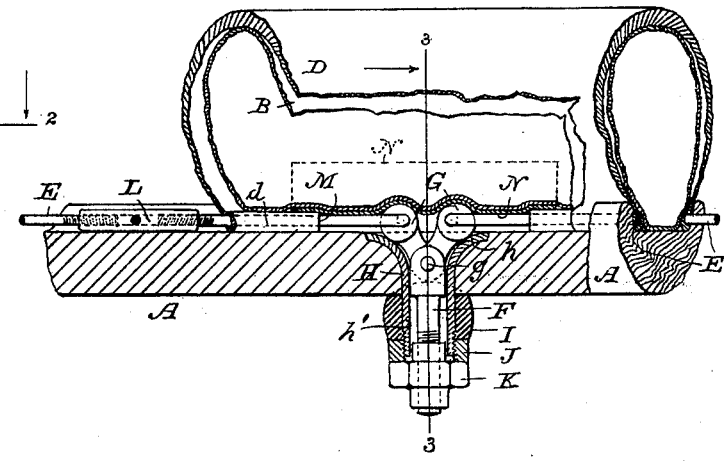
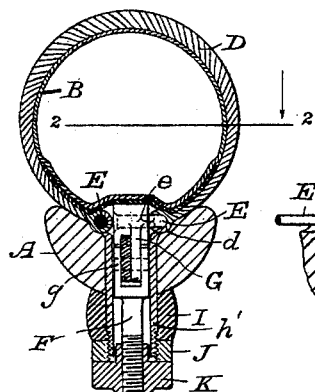
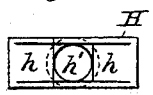
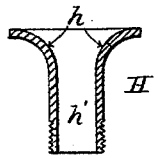
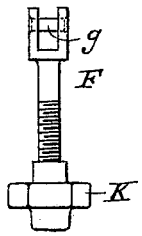
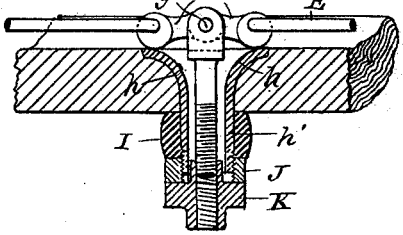
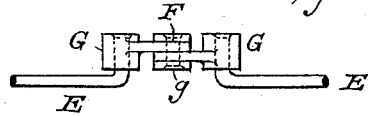
WITNESSES:
W. B. Skinkle.
Geo. F. Williams
INVENTOR
George A. Burwell
BY
Wm. A. Skinkle
ATTORNEY.
THE NORRIS PETERS CO., PHOTO-LITHO., WASHINGTON, D. C.

UNITED STATES PATENT OFFICE.

GEORGE A. BURWELL, OF TOLEDO, OHIO.

MECHANICAL FASTENING FOR PNEUMATIC TIRES.

SPECIFICATION forming part of Letters Patent No. 619,385, dated February 14, 1899.

Application filed March 17, 1898. Serial No. 674,172. (No model.)

*To all whom it may concern:*

Be it known that I, GEORGE A. BURWELL, a citizen of the United States, residing at Toledo, in the county of Lucas and State of Ohio, have invented certain new and useful Improvements in Mechanical Fastenings for Pneumatic Tires, of which the following is a specification, that will enable those skilled in the art to which my invention pertains to make and use the same.

My invention relates particularly to that class of pneumatic tires employing inner air-tubes surrounded, protected, and held in restraint by outer shoes or coverings, which shoes are detachably secured at their edges to the rims or fellies of the wheels upon which they are mounted in such manner as to be readily released and detached therefrom to afford access to their interiors and to the air-tubes contained therein.

It consists of binding-rings composed of flexible wires or cords adapted to clamp the edges of the shoes to the rims and provided with means for adjusting their diameters so that they may be loosened and freely removed from the rim or tightened and securely clamped thereon, the particular means forming the subject of this application being applied to one or both of the binding-wires, as desired, and, extending through the rim, are controlled by nuts, which are accessible from the exterior.

The accompanying drawings illustrate my invention and some of its modifications in the best forms now known to me; but some changes in the features of construction and the relative positions of the parts might be made by a skilful mechanic without departing from the spirit of my invention as set forth in the claims at the end of this specification.

Figure 1 is a view, partly in elevation and partly in longitudinal section, on the line 1 1 of Fig. 2, of a portion of a wheel-rim and pneumatic tire having my invention applied thereto. Fig. 2 is a plan view of the same with the upper portion of the pneumatic tire broken away and omitted for the purpose of more clearly illustrating the special features of the invention. Fig. 3 is a vertical transverse section of the same on the line 3 3 of Fig. 1. Fig. 4 is a view of parts of the clamping mechanism, showing them in the positions assumed when the ends of the wire band are most widely separated and the band at its greatest diameter. Fig. 5 is a detached plan view of the same. Fig. 6 is a side elevation of the clamping-bolt and its thumb-nut. Fig. 7 is a plan view, and Fig. 8 a vertical sectional view, of the metallic socket or lining for the aperture through the wheel-rim.

Binding-wires for the edges of pneumatic tires of the class to which my invention belongs are well known and have been used to a considerable extent with more or less success. The principal difficulty heretofore experienced has resulted from the want of some simple, effective, and durable means for reducing or increasing the diameters of the bands, so that they may bind the covering shoes or sheaths securely upon the rims or permit of their ready removal and reapplication. I have sought to overcome this difficulty by my invention, which I will now explain in detail.

In the drawings, A is the wheel-rim, B the air-tube of a pneumatic tire, and D the sheath or shoe which surrounds and protects the air-tube and is attached to the rim. To the edges $d$ of this shoe are secured in any suitable manner clamping-wires E E, which pass around the rim and have their ends $e\ e$ pivotally connected to the contracting or tightening mechanism which constitutes my invention. This mechanism consists of a draw-bolt F, passing through an aperture in the rim and having pivotally connected to its head at $g$ two toggle-links G, the free or remote ends of which are pivotally connected to the ends of the binding-wire E. The draw-bolt G stands at a right angle to the general direction of the wire at this point and passes through an aperture in the rim to and beyond its inner face, as shown. This aperture is lined with a metallic socket H, rectangular at its opening on the face of the rim, where it is provided with rounding or sloping sides $h$, which merge into the cylindrical or tubular portion $h'$ of the socket which projects beyond the inner surface of the rim and is screw-threaded for the reception of a clamping ring or nut J. A thimble I fits over the outer end of the socket and is shaped at one end to fit snugly upon the inner surface of the rim, against which it is clamped by the ring J. This thimble may be of metal and unyielding; but I prefer to make it of rubber or similar material which will yield slightly to the excess pressure and compensate for slight variations in the sizes of the rims, as they may be affected by humidity or other causes, and thus hold all the clamping parts at proper tension without unduly straining any of them.

The outer end of the clamping-bolt F is screw-threaded and provided with a nut K, which bears against the face of the ring-nut J and draws the bolt outwardly through the socket, the toggle-links pivoted to its head following the bolt, their free ends, to which the ends of the wire are attached, sliding upon the inclined surfaces of the socket and approaching each other, thus drawing together the ends of the wire and contracting its circumference in a manner that will be well understood. I may use turnbuckles L in each wire band to adjust its length independently of or to the requirements of my special tightening mechanism, and where turnbuckles are used they should preferably, though not necessarily, be located on the opposite side of the wheel to the tightening device—that is, half-way around the wheel.

At the points where the binding-wires are connected to the toggle-levers the beads of the shoe or its hollow edges $d$, in which the wires are incased, are cut away, as at M, Figs. 1 and 2, and in order to cover these gaps and to protect the delicate inner air-tube from contact with the tightening mechanism, by which it might be punctured, I provide a flap M, of canvas or other suitable material, which is secured at one of its longitudinal edges to the inner surface of the shoe and lies across the tightening mechanism, preventing the air-tube from coming in contact therewith or "blowing out" through the openings or deep depressions of the mechanism.

Having thus described my invention, what I desire to secure by Letters Patent is—

1. In a vehicle-wheel the combination of a rim, an aperture through the rim having an expanding or flaring mouth, a pneumatic-tire sheath or shoe, a binding-wire to engage each edge of the shoe, each of its ends being pivotally connected to the separable extremities of toggle-links which when drawn into the flaring mouth of the aperture are caused to approach each other and draw the ends of the wire together, contracting its circumference substantially as set forth.

2. In a vehicle-wheel the combination of a rim, an aperture with an inclined or sloping mouth formed through the rim, a pneumatic-tire shoe, a binding-wire to engage the edge of the shoe, toggle-links pivotally connected at their free ends to the ends of the wire, with a bolt lying in the aperture, pivotally connected to the inner ends of the toggle-links and provided with an adjusting-nut on its end projecting beyond the inner surface of the rim, substantially as set forth.

3. In a wheel-tire the combination of the rim A, tire-shoe D, wire band E, bolt F, toggle-links G, and nut K, with the aperture through the rim, the socket H, with its inclined mouth lining said aperture and extending beyond the outer face of the rim, the thimble I, and screw nut or ring J, all arranged and operating, substantially as set forth.

4. In a wheel-tire the combination of the rim A, tire-shoe D, wire band E, and bolt F, the toggle-links connected to the bolt and to the ends of the wire band, the nut K, the aperture through the rim and the socket H, with its flaring mouth and tubular shank, the elastic thimble I, on the outer end of the socket and the ring or nut J, arranged and operating, substantially as set forth.

In testimony whereof I affix my signature, in the presence of two witnesses, at Toledo, Ohio, February 12, 1898.

GEORGE A. BURWELL.

Witnesses:
CHAS. J. MOORE,
R. W. KIRKLEY.